United States Patent Office 3,068,388
Patented Dec. 11, 1962

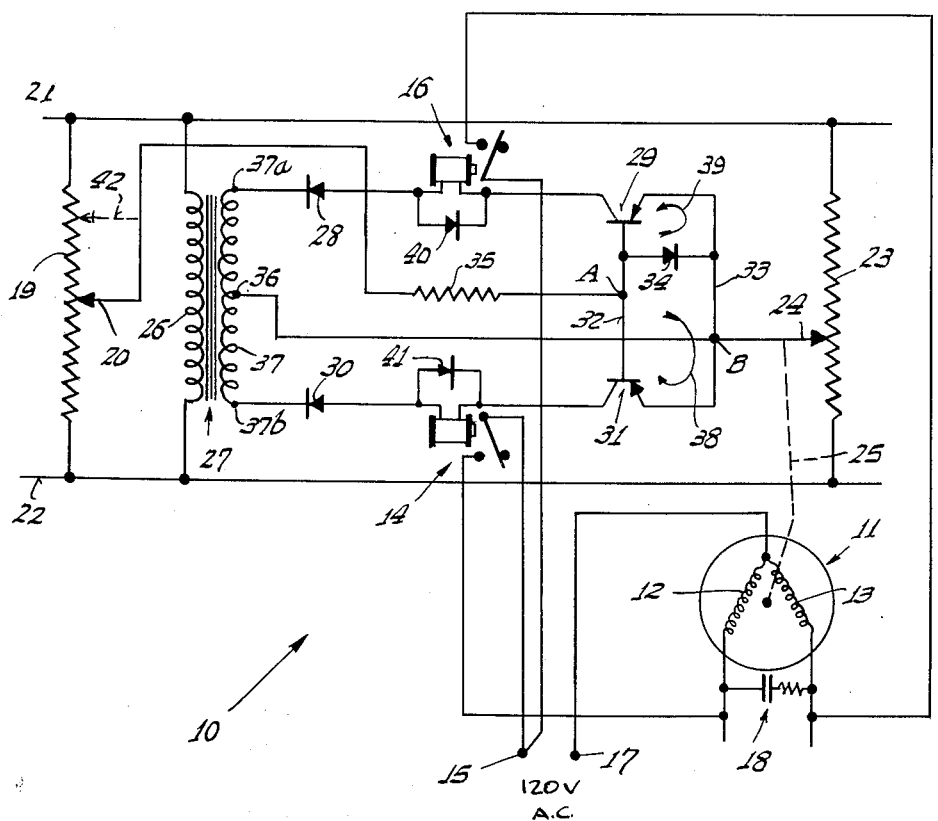

3,068,388
ELECTRIC MOTOR POSITIONING CONTROL CIRCUIT
Leonard J. G. Burski, Bristol, Conn., assignor to The Superior Electric Company, Bristol, Conn., a corporation of Connecticut
Filed Mar. 14, 1960, Ser. No. 14,719
9 Claims. (Cl. 318—29)

The present invention relates to an electric circuit in which a manually adjustable controller is employed to adjust the position of a controlled device which may be located remotely from the controller.

In many installations a plurality of controllers are combined together in a small area to be easily accessible to an operator while the devices controlled are located remotely from the area. With such an arrangement, it is essential that the controller and controlled device be interrelated in a manner which associates the alignment of the controlled device with the position of the controller, in addition to the controlled device being as responsive, as rapidly as is required, to movement of the controller to different positions and the maintaining of this position.

It is accordingly an object of the present invention to provide a remote control positioning circuit having a manipulatable controller which may be located remotely from the controlled device and yet accurately and rapidly control said device.

Another object of the present invention is to provide a remote control positioning circuit in which alternating current may be employed to provide energy for the circuit and in which the circuit may be used to control the rotation of a reversible motor.

A further object of the present invention is to achieve the above objects with a minimum number of relatively economical components that are connected together to form a circuit that is durable and relatively free from malfunctioning.

In the specific embodiment of the invention hereinafter described, the circuit of the present invention is employed to control the energization of a reversible electric motor of the type disclosed in the patent to Feiertag et al. No. 2,589,999 which requires two paths for energizing the motor, one path when energized causing rotation of the motor in one direction and the other path when energized causing a reverse rotation of the motor. Though the present invention is specifically disclosed as controlling a motor, it will be appreciated that it may control any electrical mover requiring energization of one path for movement in one direction and energization of another path for movement in the other direction. The circuit, as herein described, includes a solenoid actuated switch in each path for energizing the path of the controlled device from a source of electrical energy.

In the circuit, there is provided a controller which may be manually operated and a similar controller that is connected to the controlled device to be correlated to movement thereof. Both controllers consist of voltage dividers having movable taps and both dividers are connected across a pair of leads that are connectible to a source of alternating current. Whenever the two taps of the controllers are at different positions there is a voltage difference therebetween which is used to energize one path or the other of the controlled device and thus movement thereof until the tap of the second controller is positioned by the movement to be at the same voltage as the first.

Other features and advantages will hereinafter appear.

Referring to the drawing, the only FIGURE is a schematic diagram of the electric circuit of the present invention.

In carrying out the present invention, the electric circuit is generally indicated by the reference numeral 10 and is used to control in the specific embodiment of the invention herein described, a reversible electric motor 11 having one winding 12 which, when inphase energized, causes rotation of the motor in one direction, sometimes specifically referred to as the "up" direction and another winding 13 which, when inphase energized, causes the reverse rotation or "down" movement of the motor. The "up" winding 12 is connected through a relay switch 14 to one terminal 15 of an A.C. supply of suitable voltage while the "down" coil 13 is connected through a relay switch 16 to the same terminal. The other terminal 17 of the source is connected to be common with both windings 12 and 13 while a phase shifting network 18 is interconnected between the two windings.

While the manipulatable controller may consist of an autotransformer or other voltage dividing equipment having a tap, herein it consists of a variable resistance having a resistor 19 and a tap 20. The resistor 19 is connected across leads 21 and 22 which in turn are connectible to a source of alternating current of preferably low voltage. There is also provided a similar variable resistance having a resistor 23 and a tap 24 connected across the leads 21 and 22. The tap 20 is mounted to be moved by an operator while the tap 24 is connected to the motor as indicated by the dotted line 25 such that rotation of the motor will move the tap 24 along its coil from one extreme position to the other. Thus if the motor is used to drive an adjustable voltage autotransformer having a 320° movement from one extreme to the other then the tap will be connected to the motor to be moved from one of its extremes to the other for the same movement of the motor.

There is also connected across the leads 21 and 22 a primary winding 26 of a transformer 27. The path for energizing the down relay switch 16 includes in series with the relay coil a diode 28 and a PNP transistor 29 and similarly a path for controlling the relay coil of up relay switch 14 includes a diode 30 and a PNP transistor 31. The relay switches 14 and 16, the diodes 28 and 30 and the transistors 29 and 31 are each substantially the same. The bases of the transistors 29 and 31 are connected by a lead 32 while these emitters are connected by another lead 33 with a diode 34 connected between the leads 32 and 33. Moreover, it will be seen that the tap 20 is connected through a resistor 35 to the lead 32 at the point "A" while the tap 24 is connected to the lead 33 at the point "B." Thus at the points A and B appear the potential of the taps 20 and 24 respectively and if there is a potential difference therebetween, current will tend to flow in the leads 32 and 33. In addition, connected to the point B is the center tap 36 of a secondary winding 37 of the transformer 27 while the diodes 28 and 30 are connected to opposite ends of the winding to be in series with their associated relay switches 14 and 16 and to be conductive in the same direction.

The circuit is designed to operate whenever the point B has a positive potential with respect to the point A so that an emitter-base current will flow in the direction of the arrows 38 and 39 thereby rendering the emitter-collector circuits of the transistors conductive. In this regard, when the leads 21 and 22 are connected to a source of alternating current, there is only current in the emitter-base circuits of the transistors for the one half of a cycle when the point B is positive with respect to the point A. It will be clear that there will be conduction of current through the emitter-collector circuits serving to energize the relays only when (provided the transistors are biased to conduct) current is capable of flowing forwardly through the diodes 28 and 30. This occurs by the end of the secondary winding adjacent the diodes being negative with respect to the center tap 36. Thus, for each cycle of energy in the leads 21 and 22, the relay switches will be energized for only one half their cycle but with a diode such as 40 and 41 connected across each relay switch, flickering of the switches will be prevented.

With the circuit as shown and the taps 20 and 24 being at the same potential, points A and B are at the same potential and hence no current flows in the emitter-base circuit of the transistors and hence they are non-conducting in their emitter-collector circuits. If the tap 20 is moved to the dotted position, indicated by the reference numeral 42, to cause up rotation of the motor, it will be clear that the point A will be positive with respect to the point B whenever the lead 21 is positive with respect to the lead 22 and hence nothing will occur as there is no emitter-base current. The use of PNP transistors requires, for an emitter-base current, for the emitter to be positive with respect to the base. However, when the lead 21 becomes negative with respect to the lead 22, the point B becomes positive with respect to the point A and emitter-base currents will flow in both transistors. While both transistors are thus capable of conducting in their emitter-collector circuits, conduction in the path including the emitter-collector circuit of the transistor 21 from the tap 36 to the end 37a of the winding is blocked by the diode 28 since the end 37a is positive with respect to the tap 36. However, the emitter-collector circuit of the transistor 31 has current therethrough to energize the relay coil and thereby close relay switch 14 by the tap 36 being positive with respect to the end 37b and hence current flows through the diode 30. This causes closing of the relay switch through the up coil 12 and hence the motor will be caused to rotate in a direction which would move the tap 24 upwardly. Such rotation will cease when the tap 24 is at a position on the coil 23 that causes the potential at the point B to be the same, as the tap 20 causes the potential to be at the point A thereby breaking the current in the emitter-base circuit of the transistors and opening the relay switch 14.

If the tap 20 is moved "downwardly," i.e. towards the lead 22, it will be clear that there is no conduction through the transistors during the portion of the cycle when the lead 21 is negative with respect to the lead 22. However, when the leads have a reverse polarity, the point A will be negative with respect to the point B, causing emitter-base currents to flow in both transistors. However, as the tap 36 becomes positive with respect to the end 37a no current flows in the relay switch 14 path but flows in the relay switch 16 path as the end 37b is negative with respect to the tap 36 and thus current will cause the motor to be rotated to move the tap 24 downwardly until it reaches the position where it places the point B in the same potential with the point A when the relay switch 16 opens.

It will thus be understood that the circuit of the present invention only closes the relay switches whenever the position of the motor as represented by the tap 24 produces a potential that is different from potential from the tap 20 of the manipulatable controller 19 for a half cycle of alternating current. This, however, is sufficient to maintain the relay coils closed. Moreover, such structure requires that for each one half cycle, the transistors 29 and 31 are "shut off" and hence thus must be energized for the other one half cycle by a difference of potential between the point B and point A. This decreases the "hunting" of the circuit and stabilizes the operation of the motor.

It will accordingly be appreciated that there has been disclosed a remote control positioning circuit composed of relatively few inexpensive parts that form a durable and operative circuit. The circuit is employed to control the energization and hence movement of a controlled device with one device having one path which when energized causes movement in one direction and another path for causing movement in the reverse direction. The circuit includes a pair of voltage dividers, each having a movable tap with one tap being manipulatable and the other being moved by and with movement of the controlled device. The voltage dividers are connected across a pair of energized leads and the taps are thus each at a potential. Whenever the taps have a different potential, one of the controlled device's energizing paths is energized to cause movement of the controlled device in the desired direction. The tap of one of the voltage dividers is moved by the controlled device and movement continues until there is no potential difference between the taps when the controlled device's energizing path is opened.

Variations and modifications may be made within the scope of the claims and portions of the improvements may be used without others.

I claim:

1. A remote control positioning circuit for effecting energization of an electric moving means by completing either of two paths, each causing movement of the means in a different direction comprising a pair of leads connected to a source of electrical energy, a first voltage divider connected to be energized by the leads and having a manipulatable tap, a second voltage divider connected to be energized by the leads and having a tap moved with and by the electric moving means, path energizing circuits each including a relay connected in the output circuit of a transistor, means for applying the voltage difference between said taps to the signal receiving input circuits of the transistors and means connnectible to a source of electrical energy for supplying electrical energy to the output circuits of the transistors.

2. A remote control positioning circuit for effecting energization of an electric moving means by completing either of two paths, each causing movement of the means in a different direction comprising a pair of leads connected to a source of electrical energy, a first voltage divider connected across the leads and having a manipulatable tap, a second voltage divider connected across the leads and having a tap moved with and by the electric moving means, path energizing circuits each including a relay connected in the emitter-collector output circuit of a transistor, means connecting the emitter-base circuits of the transistors in parallel for applying the voltage difference between the two taps to the emitter-base circuits of the transistors and means for supplying electrical energy to the emitter-collector circuits of the transistors.

3. A remote control positioning circuit for effecting energization of an electric moving means by completing either of two paths, each causing movement of the means in a different direction comprising a pair of leads connected to a source of alternating current, a first voltage divider connected across the leads and having a manipulatable tap, a second voltage divider connected across the leads and having a tap moved with and by the electric moving means, path energizing circuits each including a relay connected in the emitter-collector output circuit of a transistor, means connecting the emitter-base circuits of the transistors in parallel between the taps for applying the voltage difference between the two taps to the emitter-base circuits of the transistors, said transistors being alike and having current flow in their emitter-base circuits for only the half cycle of one polarity of the voltage difference and means for supplying electrical energy to the emitter-collector circuits of the transistors.

4. The invention as defined in claim 3 in which there is a one-way valve connected across the emitter-base circuits of the transistors for shunting current of a polarity reversed from the polarity flowing in the emitter-base circuits.

5. A remote control positioning circuit for effecting energization of an electric moving means by completing either of two paths, each causing movement of the means in a different direction comprising a pair of leads connected to a source of alternating current, a first voltage divider connected across the leads and having a manipulatable tap, a second voltage divider connected across the leads and having a tap moved with and by the electric moving means, path energizing circuits each including a relay and a diode connected in the emitter-collector circuit of a transistor, means for applying the voltage difference between the two taps to the emitter-base circuits of the transistors and means for supplying alternating current to the emitter-collector circuits of the transistors, said diodes rendering their associated emitter-collector circuit conducting for only one half of each cycle.

6. The invention as defined in claim 5 in which the means for supplying alternating current to the emitter-collector circuits includes a transformer having a primary winding connected across the input leads and a tapped secondary winding and means connecting one branch thereof in one said energizing circuit and the other branch of the secondary winding in the other said energizing circuit.

7. The invention as defined in claim 6 in which the connections include a center tap on the secondary winding connected to the emitters of the transistors with one end of the secondary winding being connected to the collector of one path energizing circuit through the diode and the other end connected to the collector of the other path energizing circuit through the diode.

8. A remote control positioning circuit for effecting energization of an electric moving means by completing either of two paths, each causing movement of the means in a different direction comprising a pair of leads connected to a source of alternating current, a first voltage divider connected across the leads and having a manipulatable tap, a second voltage divider connected across the leads and having a tap moved with and by the electric moving means, path energizing circuits each including a relay and a diode connected in the emitter-collector output circuit of a transistor, means connecting the emitter-base circuits of the transistors in parallel between the two taps for applying the voltage difference between the two taps to the emitter-base circuits of the transistors and means for supplying alternating current to the emitter-collector circuits of the transistors, said diodes rendering their associated emitter-collector circuits conducting for only one half of each cycle and said diodes being connected to effect conduction through one path energizing circuit for one half of the cycle and through the other path energizing circuit for the other half of the cycle.

9. A remote control positioning circuit for effecting energization of an electric moving means by completing either of two paths, each causing movement of the means in a different direction comprising a pair of leads connected to a source of alternating current, a first voltage divider connected across the leads and having a manipulatable tap, a second voltage divider connected across the leads and having a tap moved with and by the electric moving means, path energizing circuits each including a relay and a diode connected in the emitter-collector output circuit of a transistor, said transistors being alike and having current flow in their emitter-base circuits for only the one half cycle of one polarity of the voltage difference, means connecting the emitter-base circuits of the transistors in parallel between the two taps for applying the voltage difference between the two taps to the emitter-base circuits of the transistors and for supplying alternating current to the emitter-collector circuits of the transistors including a transformer having a primary winding connected across the input leads and a secondary winding having a center tap and connections connecting the center tap to the emitters of the transistors with one end of the secondary winding being connected to the collector of one path energizing circuit through its associated diode and the other end connected to the collector of the other path energizing circuit through its associated diode, said diodes rendering their associated emitter-collector circuits conducting for only one half of each cycle and said diodes being connected to effect conduction through one path energizing circuit for one half of the cycle and through the other path energizing circuit for the other half of the cycle.

References Cited in the file of this patent

UNITED STATES PATENTS

| 2,426,508 | Isserstedt | Aug. 26, 1947 |
| 2,534,801 | Siltamaki | Dec. 19, 1950 |
| 2,846,630 | Boyle et al. | Aug. 5, 1958 |
| 2,864,985 | Beck | Dec. 16, 1958 |
| 2,922,930 | Shaive | Jan. 26, 1960 |